(No Model.)

J. E. NASH.
EGG SEPARATOR.

No. 550,998. Patented Dec. 10, 1895.

Witnesses
Chas H. Ourand
V. B. Hillyard.

Inventor
John E. Nash
By his Attorneys.
C. A. Snow & Co.

UNITED STATES PATENT OFFICE.

JOHN E. NASH, OF HAWARDEN, IOWA.

EGG-SEPARATOR.

SPECIFICATION forming part of Letters Patent No. 550,998, dated December 10, 1895.

Application filed April 5, 1895. Serial No. 544,656. (No model.)

*To all whom it may concern:*

Be it known that I, JOHN E. NASH, a citizen of the United States, residing at Hawarden, in the county of Sioux and State of Iowa, have invented a new and useful Egg-Separator, of which the following is a specification.

This invention has for its object to lessen the labor of the merchant in handling eggs shipped direct by the farmer or others engaged in raising this product.

It is a matter of common knowledge that farmers and others engaged in the traffic of eggs generally ship the same packed in bran, sawdust, oats, and like filling material to prevent the breakage of the eggs in transportation, and the merchant receiving a consignment of goods so packed is compelled to dig out and remove the eggs from the filling material at the expense of considerable and oftentimes valuable time, which process is both slow and tedious.

The present invention aims to provide a structure by means of which the eggs can be quickly separated from the filling or packing material without resulting in loss of the goods by breakage.

To this end the improvement consists of the novel structure hereinafter more particularly described, and shown in the annexed drawings, in which—

Figure 1:
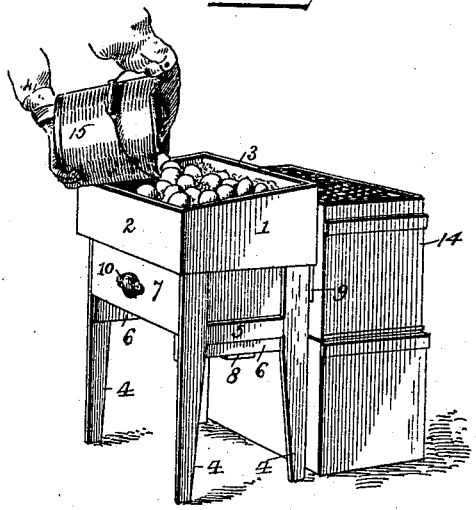
Figure 2:
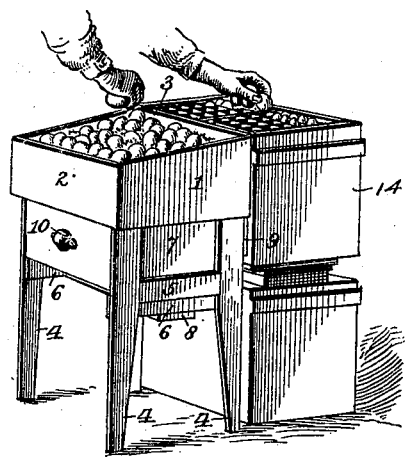
Figure 3:
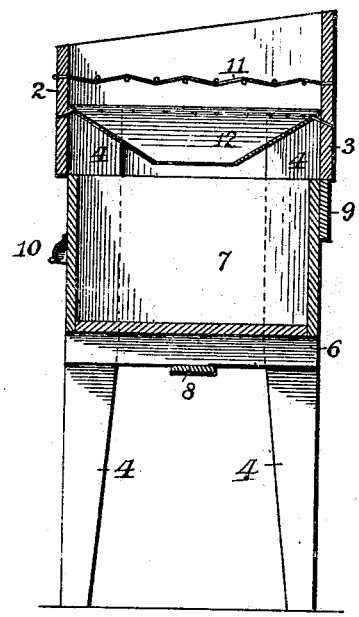
Figure 4:
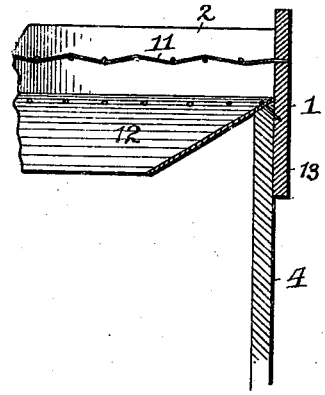

Figure 1 is a perspective view of the invention, showing the manner of dumping the eggs into the separator. Fig. 2 is a view similar to Fig. 1, showing the manner of separating the eggs and placing them into the packing-case. Fig. 3 is a cross-section of the structure. Fig. 4 is a detail view showing the preferred manner of supporting the inner hopper, by means of which the packing or filling material is centralized within the waste-drawer.

The separator comprises a frame formed by means of end pieces 1 and front and rear sides 2 and 3, respectively. This frame is supported upon corner posts or legs 4, which are attached at their upper ends to the said frame in any desired manner, and which are fitted in the respective angles formed between the side and end pieces. These posts or legs are strengthened and braced by cross-bars 5 and by cleats 6, the latter forming supports for the waste-drawer 7, which is adapted to slide thereon beneath the frame. A longitudinal bar 8 is attached at its ends to the cleats 6 and serves to further strengthen and brace the structure. A bar 9 is located beneath the rear side 3 and is secured at its ends to the rearmost legs or posts 4, and forms a stop to limit the movement of the waste-drawer when the latter is pushed in.

The waste-drawer 7 is of a size approximating the dimensions of the frame, so as to come within the confines of the same and receive the packing or filling material during the process of separating the latter from the eggs. This drawer is provided with a handle or knob 10, of any desired pattern, by means of which it can be drawn out when it is required to remove the same for the purpose of disposing of the waste material.

A separating-screen 11 is located within the frame and is attached to the sides thereof in any desired and convenient manner, and the wires comprising the same are sufficiently small to prevent injurious contact thereof with the eggs, whereas the meshes formed are of such a size, being approximately an inch square, to avoid a rolling and sliding of the eggs on the said screen during the operation of separating the eggs. The position of the wires should be fixed at the points of crossing, preferably by twisting the said wires or in any of the usual ways, thereby preserving the relative size of mesh.

That portion of the frame above the separating-screen 11 forms practically a hopper, into which the eggs and filling material are dumped when it is required to free the said eggs from the packing in which they are shipped. The front portion of the hopper is lower than the ends and rear side to facilitate the dumping of the eggs upon the screen, as will be readily understood. The ends are lower than the rear side, and the top edges slope from the top edge of the rear to the top edge of the front side, whereby the upper end of the hopper is in a plane which inclines to the plane of the separating-screen in a forwardly and downwardly direction from the rear side of the structure.

The lower hopper 12 is placed beneath the separating-screen, and its sides incline inwardly and downwardly from the walls of the frame to deflect the waste material to a central portion of the drawer 7. This lower hopper may be attached to the sides of the frame in any convenient manner and may be constructed of wood or sheet metal, the latter being preferred because of the resultant advantages of lightness and neatness in appearance. The upper ends of the legs or posts 4 are beveled to correspond to the incline of the sides of the hopper 12, as shown at 13, so as to support the said hopper 12 and provide an extended bearing-surface for the engagement of the hopper therewith. In some instances the support afforded the hopper 12 by the beveled ends 13 of the posts 4 will be sufficient to sustain the hopper without requiring the employment of other securing means; but, if preferred, nails or additional fastenings may be employed for securing the hopper in a fixed position to the walls of the main frame.

The separator herein specifically set forth is effective for the purpose designed and is both light and compact in its structure.

The operation of the invention is clearly illustrated in Figs. 1 and 2 of the drawings, which show the packing-case 14 arranged in proximate relation to the separator, so that the merchant can remove the eggs from the separating-screen and place them in the pockets or cells of the packing-case at one handling. This is clearly indicated in Fig. 2. The general practice of the raiser is to send the eggs to the merchant in a bucket or similar package 15, packed in loose filling material to prevent breakage of the eggs. Instead of digging the eggs out of the filling material by hand, which is the usual way, the merchant by the present invention dumps the eggs and filling material upon the screen of the separator, as clearly shown in Fig. 1, and the loose filling material passes through the meshes of the screen 11 into the waste-drawer 7, while the eggs are supported by means of the screen 11, and are removed therefrom and placed in the packing-case substantially in the manner indicated in Fig. 2. Thus it will be seen that the task and slow process of digging the eggs by hand from a bulk of filling material are wholly obviated and replaced by a more expeditious method in the use of the present invention.

Having thus described the invention, what is claimed as new is—

An appliance for separating the packing or filling material from eggs, constructed substantially as herein shown and described and consisting of a rectangular frame having its upper end inclining forwardly and downwardly from the rear side, a horizontal separating screen formed of fine wires disposed to provide comparatively large meshes to support and prevent the eggs from rolling about, and attached at its edges to the inner sides of the frame at a point between their top and bottom edges, a hopper located beneath the separating screen and having its sides sloping inwardly and downwardly from the walls of the frame and attached at its outer edge to the said walls and located above the plane of the lower end of the said frame, supporting legs attached to the frame and having their upper ends beveled to correspond to the inclination of the sloping sides of the said hopper to engage with and support the same, cleats secured to and bracing the legs, a waste drawer slidably supported upon the said cleats, and a rear longitudinal bar secured to the upper end portions of the rear legs to brace the latter and limit the inward movement of the waste drawer, substantially as set forth.

In testimony that I claim the foregoing as my own I have hereto affixed my signature in the presence of two witnesses.

JOHN E. NASH.

Witnesses:
   J. A. JENSON,
   J. M. LYNN.